United States Patent [19]
Kim

[11] Patent Number: 6,160,777
[45] Date of Patent: Dec. 12, 2000

[54] APPARATUS AND METHOD FOR GENERATING BLOCK SYNCHRONOUS SIGNAL FOR DIGITAL VERSATILE DISC

[75] Inventor: Han Gyoon Kim, Seoul, Rep. of Korea

[73] Assignee: Hyundai Electronics Industries Co., Ltd., Rep. of Korea

[21] Appl. No.: 09/062,287

[22] Filed: Apr. 17, 1998

[30] Foreign Application Priority Data

Apr. 19, 1997 [KR] Rep. of Korea ...................... 97-14605

[51] Int. Cl.$^7$ ...................................................... G11B 7/00
[52] U.S. Cl. .................................. 369/50; 369/59; 369/47
[58] Field of Search ................................. 369/47, 48, 49, 369/50, 54, 58, 59, 60; 360/48, 51, 53

[56] References Cited

U.S. PATENT DOCUMENTS 4,982,110  1/1991  Yokogawa et al. .
5,436,881  7/1995  Satomura .................................... 369/59

*Primary Examiner*—Muhammad Edun
*Attorney, Agent, or Firm*—Salwanchik, Llyod & Saliwanchik

[57] ABSTRACT

An apparatus and a method for generating a block synchronous signal for a digital versatile disc. The block synchronous signal generation apparatus comprises an identifier error correction code decoder for correcting errors in sector identifiers, a block synchronous signal generator for generating the block synchronous signal and a block sector identifier in response to the sector identifiers corrected by the identifier error correction code decoder and an output sector synchronous signal therefrom, the block sector identifier corresponding to an integer multiple of 16, a block synchronous signal compensator for compensating for an error in the block synchronous signal generated by the block synchronous signal generator in response to an output sector synchronous signal and the block sector identifier therefrom, a frame synchronous signal delay for delaying an output frame synchronous signal from the block synchronous signal generator in response to an output byte clock therefrom, and a data delay for delaying output data from the block synchronous signal generator in response to the output byte clock therefrom.

13 Claims, 15 Drawing Sheets

APPARATUS AND METHOD FOR GENERATING BLOCK SYNCHRONOUS SIGNAL FOR DIGITAL VERSATILE DISC

BACKGROUND OF THE INVENTION

1. Field of the Invention

The present invention relates in general to a digital versatile disc (referred to hereinafter as DVD), and more particularly to an apparatus and a method for generating a block synchronous signal for a DVD, in which a block synchronous signal compensator compensates for an error in a sector identifier (referred to hereinafter as ID) indicative of the head of data to correct it.

2. Description of the Prior Art

In a conventional DVD, only an error in an error correction code block is corrected while an error in an ID indicative of the head of the error correction code block is not corrected. For this reason, highly reliable data cannot be obtained.

On the other hand, a clock generator circuit for generating a clock for the recording and reproduction of data on/from a recording medium such as an optical disc is shown in U.S. Pat. No. 4,982,110, issued to Pioneer Electronic Corporation, Tokyo, Japan. In order to overcome a conventional problem that a synchronous signal cannot be detected when a pulse due to noises, defects, or the like is produced between two edge pulses constituting the synchronous signal, the clock generator circuit employs a synchronous signal detector and a phase comparator for the stable detection of the synchronous signal. The clock generator circuit can accurately generate the clock with no variation in phase due to a change in temperature and perform the phase comparison on the basis of only single edge information.

Further, the above patent relates to a synchronous signal detection apparatus for a disc player, which comprises synchronous signal detection means for sensing a time interval between a first edge pulse and a second edge pulse of an input signal and detecting the second edge pulse as a synchronous signal when the time interval is greater than a predetermined time interval. The synchronous signal detection apparatus further comprises determination means for determining whether or not the synchronous signal is detected in a stable manner, and input signal transmission means for inhibiting transmission of the input signal to the synchronous signal detection means for a predetermined interval of time subsequent to the first edge pulse and before the second edge pulse while it is determined that the synchronous signal is detected in the stable manner, and transmitting the input signal to the synchronous signal detection means for the predetermined interval of time between the first and second edge pulses while it is determined that the synchronous signal is not detected in the stable manner.

The above-mentioned synchronous signal detection apparatus can detect the synchronous signal even when an abnormal pulse due to noises, defects, temperature variations, or the like is produced between the two edge pulses constituting the synchronous signal. However, the above-mentioned conventional synchronous signal detection apparatus cannot detect and correct an error in an ID indicative of the head of data using the synchronous signal, thus resulting in no improvement in data reliability.

BRIEF SUMMARY OF THE INVENTION

The present invention has been made in view of the above problem and it is an object of the present invention to provide an apparatus and a method for generating a block synchronous signal for a DVD, in which a block synchronous signal generator generates the block synchronous signal, and a block synchronous signal compensator compensates for an error in an ID indicative of the head of the block synchronous signal, in order to obtain highly reliable data.

In accordance with one aspect of the present invention, it provides an apparatus for generating a block synchronous signal for a DVD, comprising a byte clock generator for generating a byte clock and a byte frame synchronous signal in response to a bit clock and a frame synchronous signal to convert bit-unit input data into byte-unit data; a first delay for delaying the frame synchronous signal from the byte clock generator in response to the byte clock therefrom; a second delay for delaying data horizontally decoded by an RS decoder in response to the byte clock from the byte clock generator; a third delay for delaying a sector synchronous signal in response to the byte clock from the byte clock generator; an identifier error correction code decoder for decoding output data from the second delay in response to an output sector synchronous signal from the third delay; a fourth delay for delaying an output frame synchronous signal from the first delay in response to the byte clock from the byte clock generator while the identifier error correction code decoder decodes the output data from the second delay and applies the delayed frame synchronous signal to a row address generator; a block synchronous signal generator for generating the block synchronous signal and a block sector identifier in response to sector identifiers corrected by the identifier error correction code decoder and an output sector synchronous signal therefrom, the block sector identifier corresponding to an integer multiple of 16; a block synchronous signal compensator for compensating for an error in the block synchronous signal generated by the block synchronous signal generator in response to an output sector synchronous signal and the block sector identifier therefrom; a fifth delay for delaying an output frame synchronous signal from the block synchronous signal generator in response to an output byte clock therefrom; and a sixth delay for delaying output data from the block synchronous signal generator in response to the output byte clock therefrom.

In accordance with another aspect of the present invention, there is provided a method of generating a block synchronous signal for a DVD, comprising the first step of setting an execution signal, the second step of setting a byte sector synchronous signal and a byte clock, and the third step of generating the block synchronous signal.

In accordance with yet another aspect of the present invention, there is provided a method of compensating for an error in a block synchronous signal for a DVD, comprising the first step of setting a sector counter, the second step of setting an error counter, and the third step of generating the block synchronous signal.

BRIEF DESCRIPTION OF THE DRAWINGS

The above and other objects, features and advantages of the present invention will be more clearly understood from the following detailed description taken in conjunction with the accompanying drawings, in which.

DETAILED DISCLOSURE OF THE INVENTION

Figure 1:
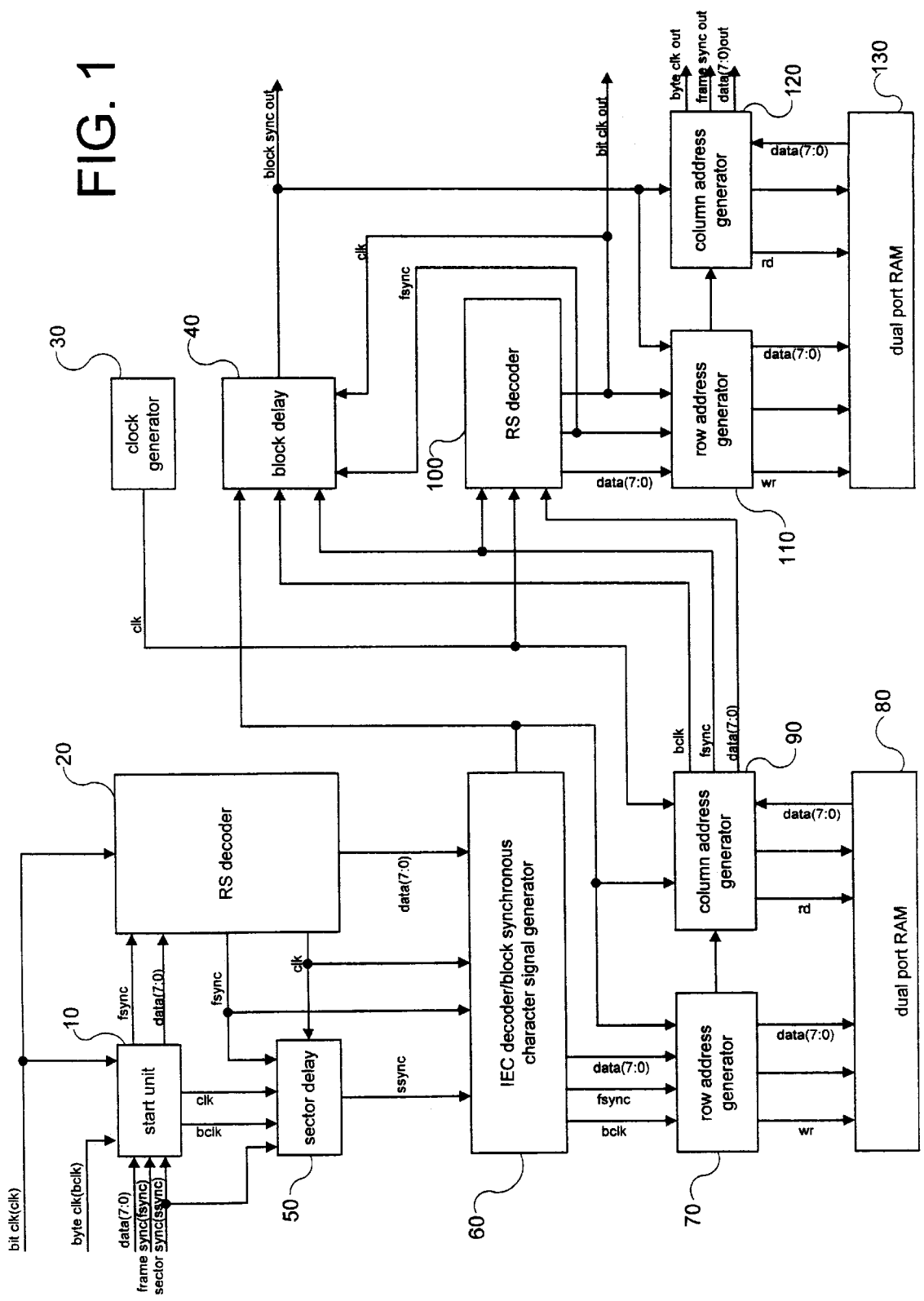
FIG. 1 is a block diagram of an apparatus for generating a block synchronous signal for a DVD in accordance with the present invention.

FIG. 1 is a block diagram of an apparatus for generating a block synchronous signal for a DVD in accordance with the present invention. An error correction code (referred to hereinafter as ECC) block must accurately be configured so that a reed solomn product code (referred to hereinafter as RSPC) decoder can be operated for the correct error correction in response to a sector synchronous signal input after being reset. A start unit 10 is adapted to detect the head of the first sector for an ID error correction code (referred to hereinafter as IEC) decoder. An RS decoder 20 is adapted to horizontally decode data in response to an output signal from the start unit 10. A clock generator 30 is adapted to generate a clock signal. A sector delay 50 is adapted to perform a sector delay operation for synchronizing data inputted after the sector head is detected by the start unit 10. An IEC decoder/block synchronous signal generator circuit 60 is adapted to detect the head of an ECC from the data horizontally decoded by the RS decoder 20 and generate the block synchronous signal in accordance with the detected ECC head.

A row address generator 70 is adapted to generate a row address in response to an output synchronous signal from the IEC decoder/block synchronous signal generator circuit 60. A dual port random access memory (referred to hereinafter as RAM) 80 is adapted to horizontally store the data horizontally decoded by the RS decoder 20 in response to the row address from the row address generator 70. A column address generator 90 is adapted to generate a column address to vertically read the data horizontally stored in the dual port RAM 80. An RS decoder 100 is adapted to vertically decode the data vertically read from the dual port RAM 80. A block delay 40 is adapted to delay the data vertically decoded by the RS decoder 100 for a predetermined time period. A row address generator 110 is adapted to generate a row address. A dual port RAM 130 is adapted to horizontally store the data vertically decoded by the RS decoder 100 in response to the row address from the row address generator 110. A column address generator 120 is adapted to generate a column address to vertically read the data horizontally stored in the dual port RAM 130.

The row and column address generators 70 and 90 are simultaneously operated. Namely, the dual port RAM 80 horizontally stores the input data in response to the row address from the row address generator 70 and vertically outputs the stored data in response to the column address from the column address generator 90. These data write and read operations are similarly applied to the row and column address generators 110 and 120 and the dual port RAM 130.

Figure 2:
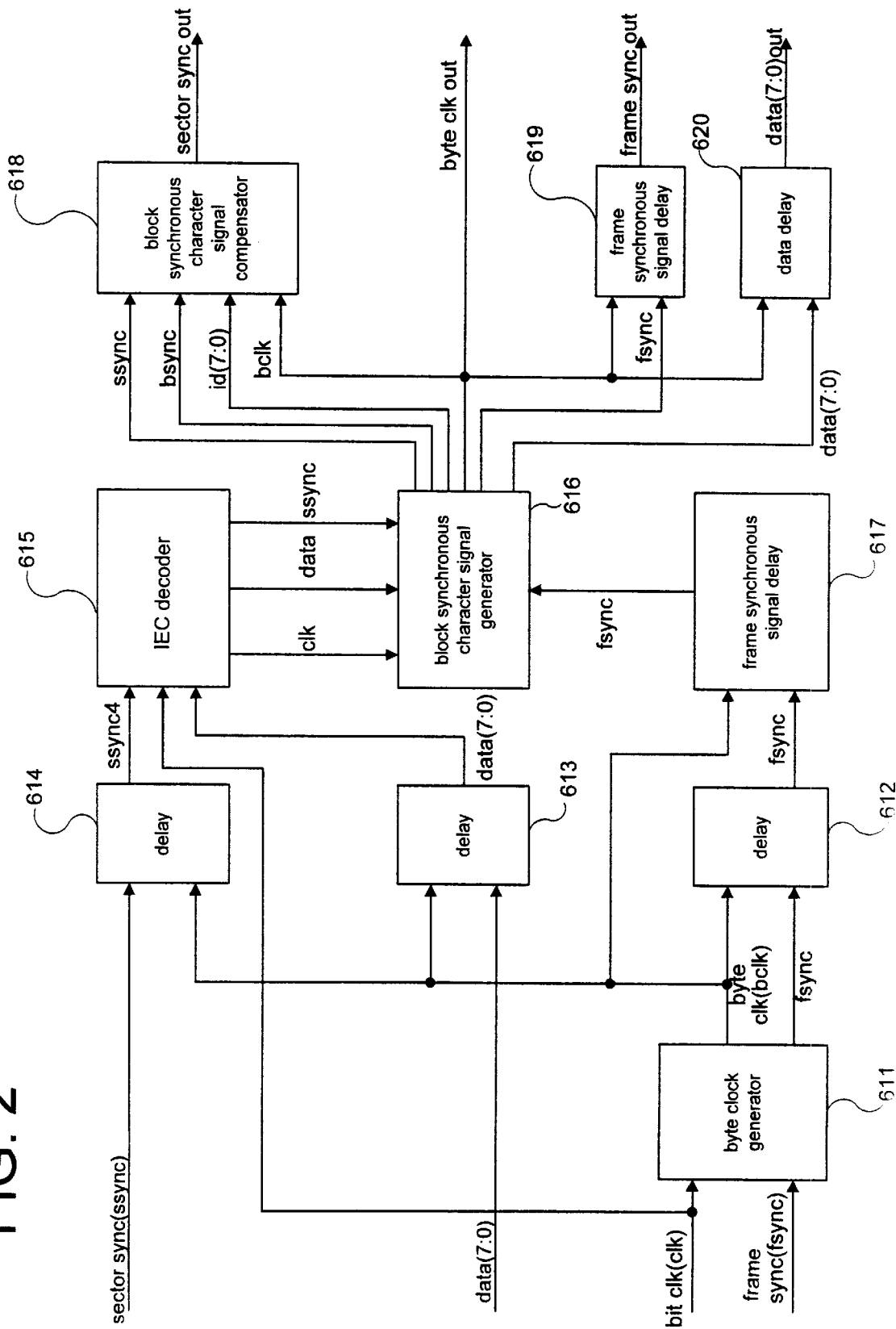
FIG. 2 is a detailed block diagram of the IEC decoder/block synchronous signal generator circuit in FIG. 1.

FIG. 2 is a detailed block diagram of the IEC decoder/block synchronous signal generator circuit 60 in FIG. 1. A byte clock generator 611 is adapted to generate a byte clock and a byte frame synchronous signal in response to a bit clock and a frame synchronous signal to convert bit-unit input data into byte-unit data. A delay 612 is adapted to delay the frame synchronous signal from the byte clock generator 611 in response to the byte clock therefrom. A delay 613 is adapted to delay the data horizontally decoded by the RS decoder 20 in response to the byte clock from the byte clock generator 611. A delay 614 is adapted to delay a sector synchronous signal in response to the byte clock from the byte clock generator 611. The delays 612–614 are provided for the timing of the data horizontally decoded by the RS decoder 20 with the sector synchronous signal and frame synchronous signal.

An IEC decoder 615 is adapted to decode the data delayed by the delay 613 in response to the sector synchronous signal delayed by the delay 614. The IEC decoder 615 is further adapted to correct random errors in each sector ID by up to one byte. A frame synchronous signal delay 617 is adapted to delay an output frame synchronous signal from the delay 612 in response to the byte clock from the byte clock generator 611 while the IEC decoder 615 decodes the data delayed by the delay 613 and applies the delayed frame synchronous signal to the row address generator 70. A block synchronous signal generator 616 is adapted to generate the block synchronous signal and a block sector ID in response to the sector IDs corrected by the IEC decoder 615 and an output sector synchronous signal therefrom. The block sector ID indicates the head of an ECC block which is composed of 16 sectors. As a result, the block sector ID corresponds to an integer multiple of 16.

A block synchronous signal compensator 618 is adapted to compensate for an error in the block synchronous signal generated by the block synchronous signal generator 616 in response to an output sector synchronous signal and the block sector ID therefrom. A frame synchronous signal delay 619 is adapted to delay an output frame synchronous signal from the block synchronous signal generator 616 in response to an output byte clock therefrom. A data delay 620 is adapted to delay output data from the block synchronous signal generator 616 in response to the output byte clock therefrom.

In the block synchronous signal generator 616, when the sector synchronous signal is received, an ID counter counts the fourth high-order byte of a header of the current sector. At this time, if low-order 4 bits of the fourth high-order byte are all 0 because the current sector ID is an integer multiple of 16, the block synchronous signal is generated. For the correction of an error in the block synchronous signal, the block synchronous signal generator 616 outputs high-order 4 bits of the fourth high-order byte as the block sector ID.

In the case where the block synchronous signal is erroneously generated due to errors in the sector ID and sector synchronous signal from the block synchronous signal generator 616, the block synchronous signal compensator 618 generates pseudo block synchronous signals to allow the RSPC decoder to preserve or normally transmit all data. Preferably, the block synchronous signal compensator 618 generates a maximum of two pseudo block synchronous signals, which may be changed according to a user's selection.

Figure 3:
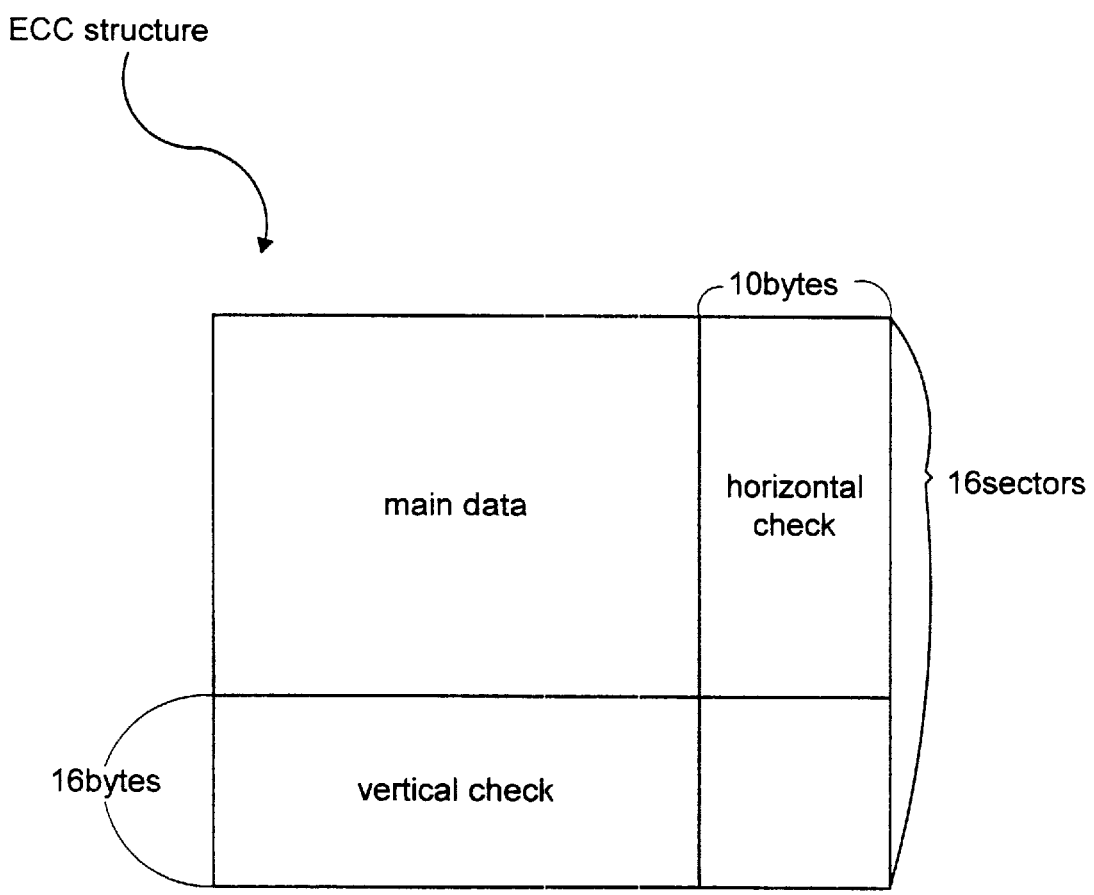
FIG. 3 is a view illustrating the structure of an ECC block.

FIG. 3 is a view illustrating the structure of an ECC block. As shown in this drawing, the ECC block is composed of main data, and horizontal and vertical check data for detecting and correcting an error in the main data. The horizontal check data is of 10 bytes in the horizontal direction, and the vertical check data is of 16 bytes in the vertical direction.

Figure 4:
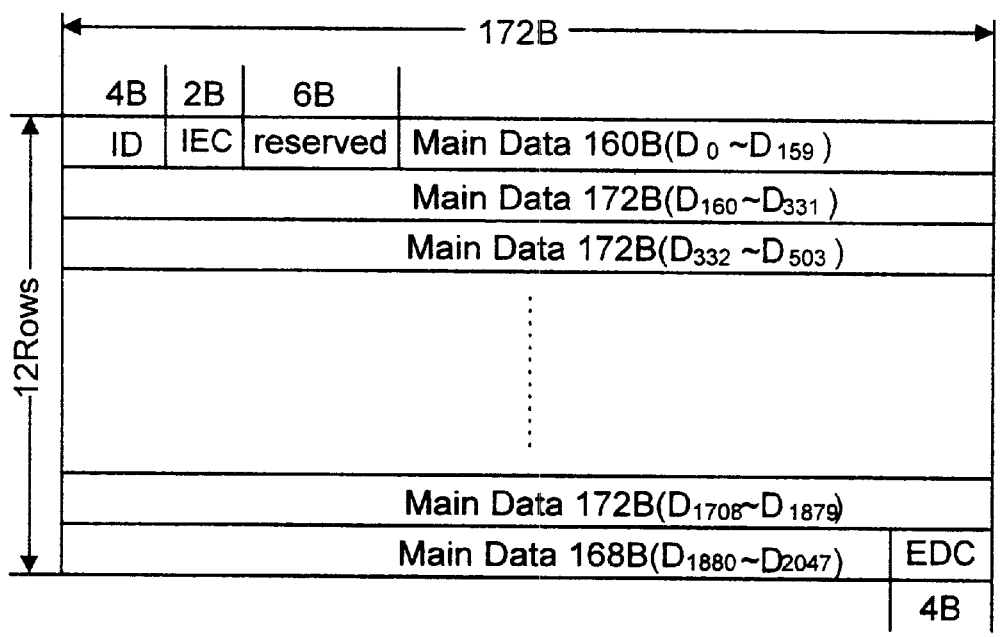
FIG. 4 is a view illustrating the structure of a sector in the ECC block in FIG. 3.
Figure 5:
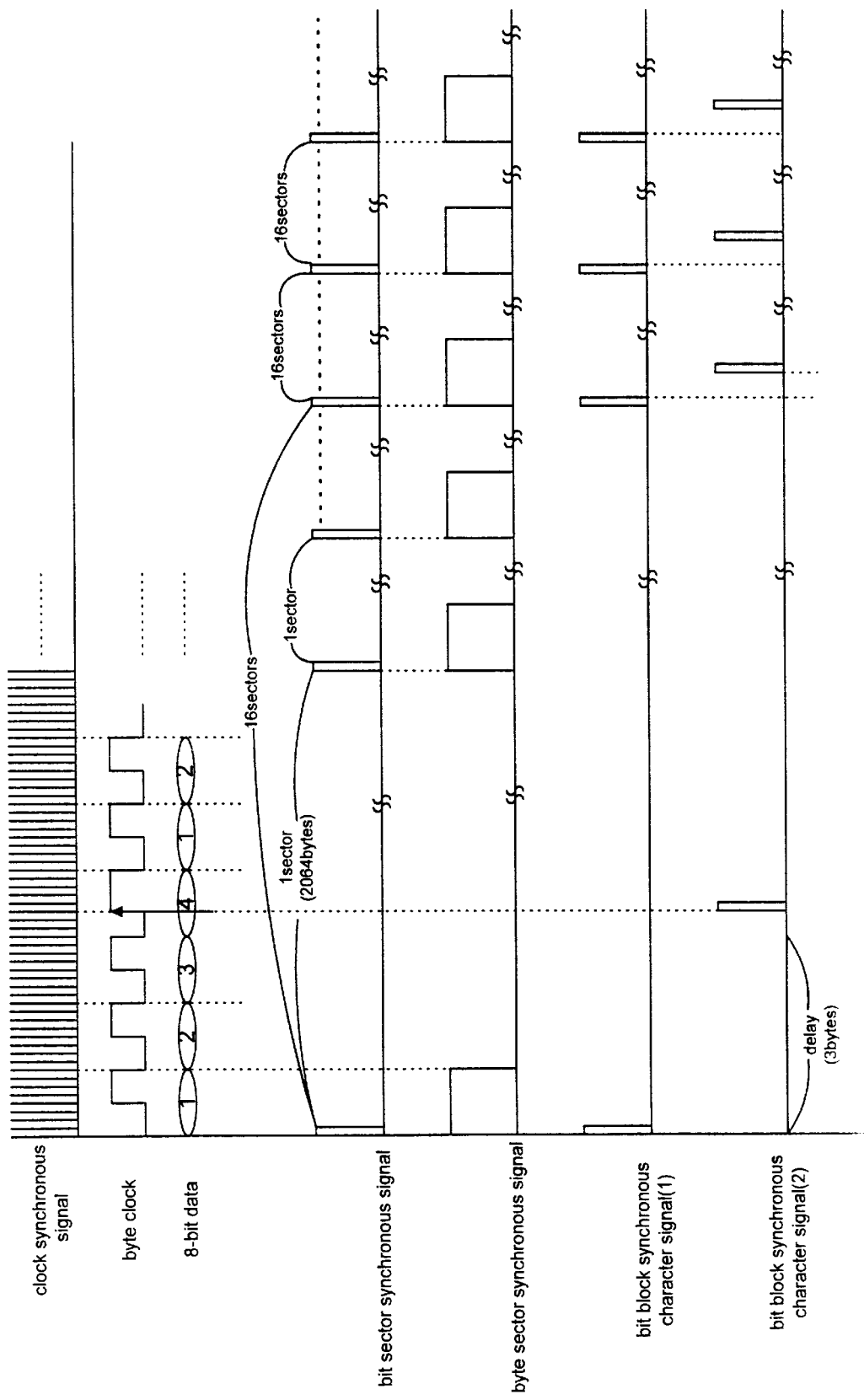
FIG. 5 is a timing diagram illustrating a procedure of generating the block synchronous signal in accordance with the present invention.
Figure 6:
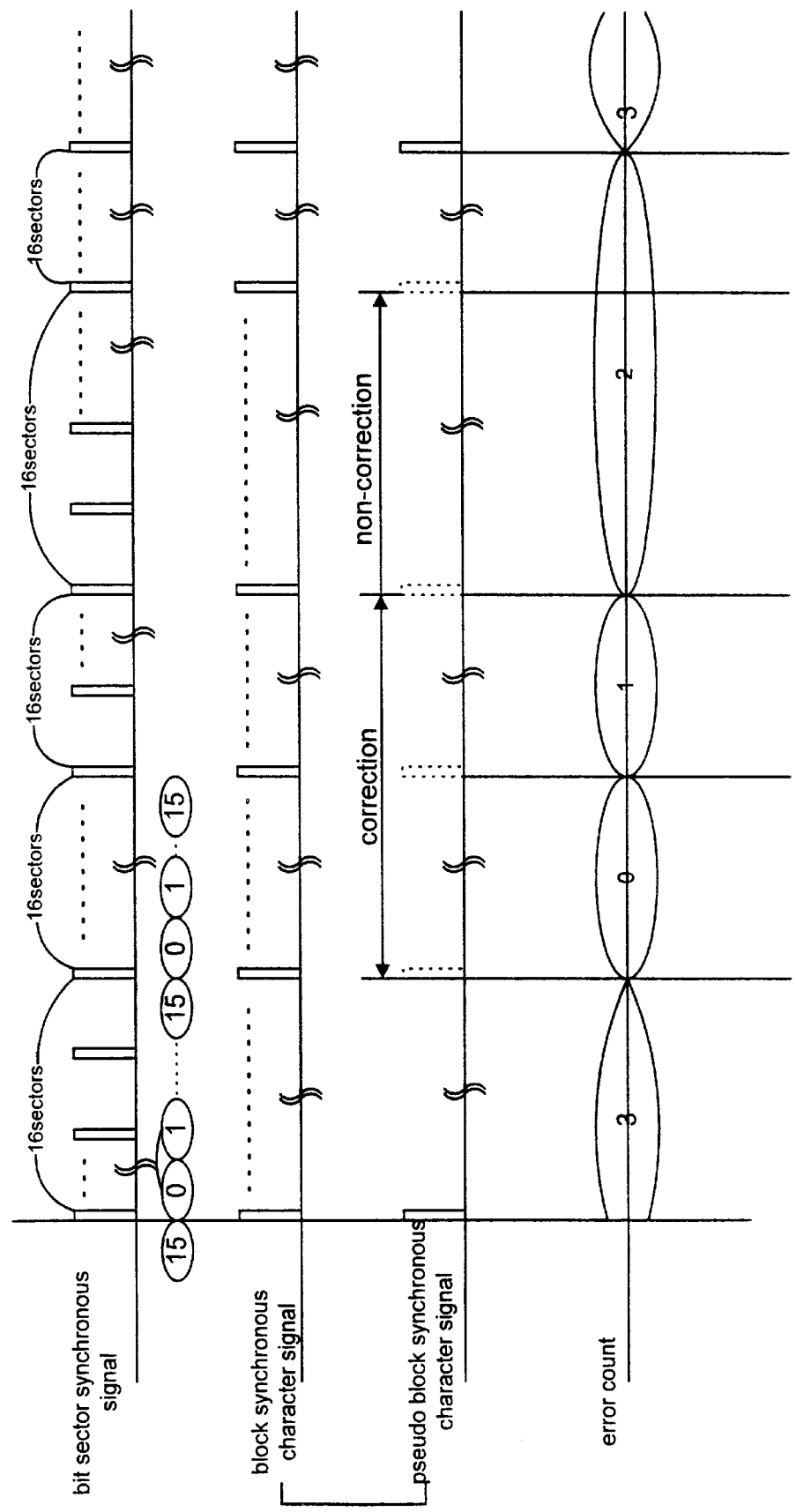
FIG. 6 is a timing diagram illustrating a procedure of generating a pseudo block synchronous signal in order to compensate for an error in the block synchronous signal in accordance with the present invention.

FIG. 4 is a view illustrating the structure of each sector in the ECC block in FIG. 3. As shown in this drawing, the sector includes a 4-byte sector ID, a 2-byte IEC for correcting an error in the sector ID, a 6-byte reserved space, 2048-byte main data and a 4-byte EDC for checking an error in the sector.

The operation of the block synchronous signal generation apparatus with the abovementioned construction in accordance with the present invention will hereinafter be described in detail.

First, in FIG. 1, upon inputting coded data, the start unit 10 detects the first sector of the input data and outputs the detected result to the sector delay 50. The sector delay 50 delays an input sector synchronous signal in response to an output signal from the start unit 10 to synchronize it with output data from the RS decoder 20.

The RS decoder 20 horizontally decodes output data from the start unit 10 and applies the horizontally decoded data to the IEC decoder/block synchronous signal generator circuit 60, which is also applied with an output sector synchronous signal from the sector delay 50.

In the IEC decoder/block synchronous signal generator circuit 60, as shown in FIG. 2, the byte clock generator 611 generates a byte clock and a byte frame synchronous signal in response to a bit clock and a frame synchronous signal to convert bit-unit input data into byte-unit data. The delays 612–614 delay the frame synchronous signal from the byte clock generator 611, the data horizontally decoded by the RS decoder 20, and the output sector synchronous signal from the sector delay 50 in response to the byte clock from the byte clock generator 611, respectively. The IEC decoder 615 decodes the data delayed by the delay 613 in response to the sector synchronous signal delayed by the delay 614.

Upon receiving output data from the IEC decoder 615, the block synchronous signal generator 616 generates the block synchronous signal and a block sector ID corresponding to integer multiple of 16 in response to the sector IDs corrected by the IEC decoder 615 and an output sector synchronous signal therefrom. The block synchronous signal compensator 618 compensates for an error in the block synchronous signal generated by the block synchronous signal generator 616 in response to an output sector synchronous signal and the block sector ID therefrom. An output frame synchronous signal from the delay 612 is delayed by the frame synchronous signal delay 617, and then applied to the block synchronous signal generator 616.

Referring again to FIG. 1, output data from the IEC decoder/block synchronous signal generator circuit 60 is horizontally stored in the dual port RAM 80 in response to a row address from the row address generator 70 and then vertically read therefrom in response to a column address from the column address generator 90. The output data from the dual port RAM 80 is applied to the RS decoder 100 so that it can be vertically decoded once more again. The output data from the RS decoder 100 is horizontally stored in the dual port RAM 130 in response to a row address from the row address generator 110 and then vertically read therefrom in response to a column address from the column address generator 120. In this mainer, data coded by a coder (not shown) is decoded horizontally and vertically while the block synchronous signal is generated, so that an error in the coded data can be corrected.

Figure 7:
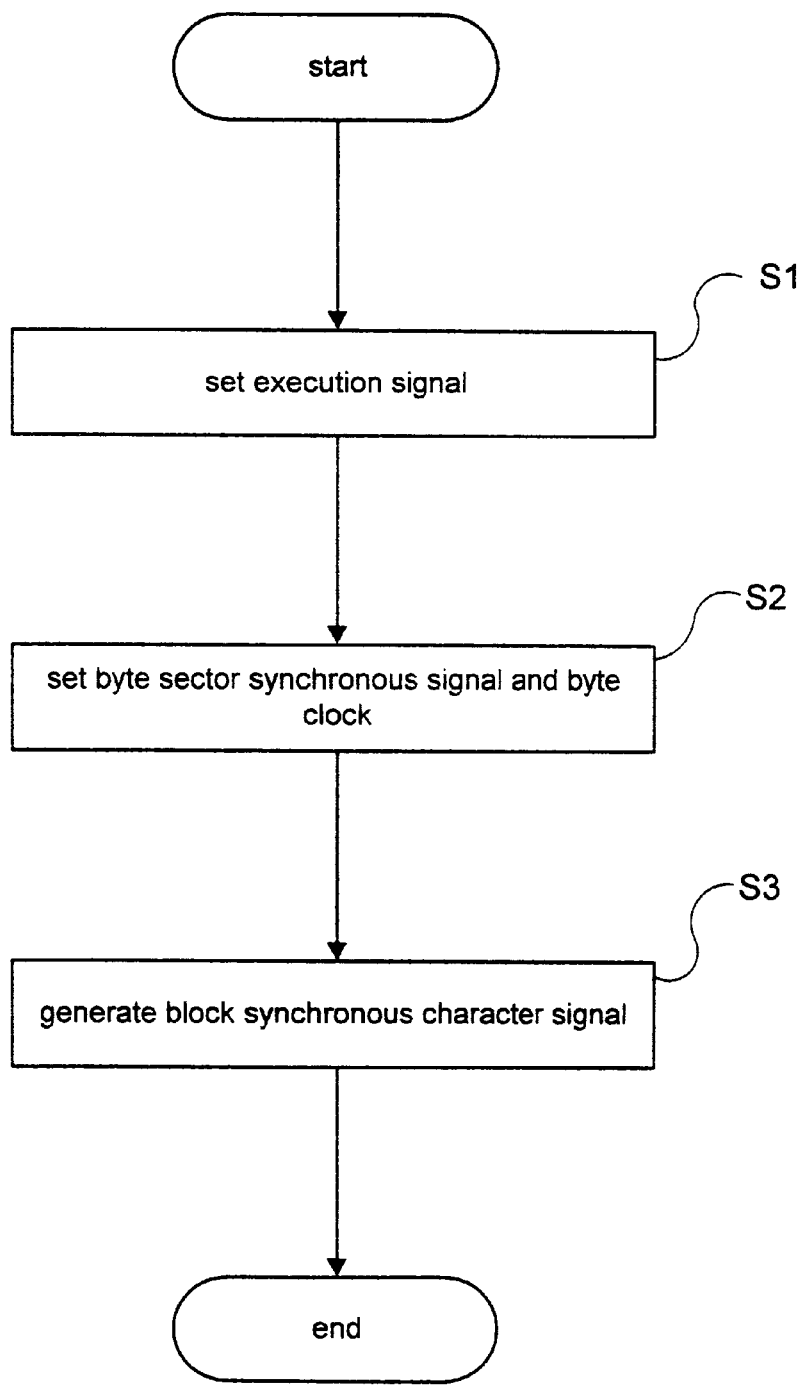
FIG. 7 is a flowchart illustrating a method of generating the block synchronous signal for the DVD in accordance with the present invention.

FIG. 7 is a flowchart illustrating a method of generating the block synchronous signal for the DVD in accordance with the present invention. The block synchronous signal generation method is adapted to generate the block synchronous signal on the basis of a header ID of input data. As shown in FIG. 7, the block synchronous signal generation method comprises step S1 of setting an execution signal, step S2 of setting a byte sector synchronous signal and a byte clock, and step S3 of generating the block synchronous signal.

Figure 8:
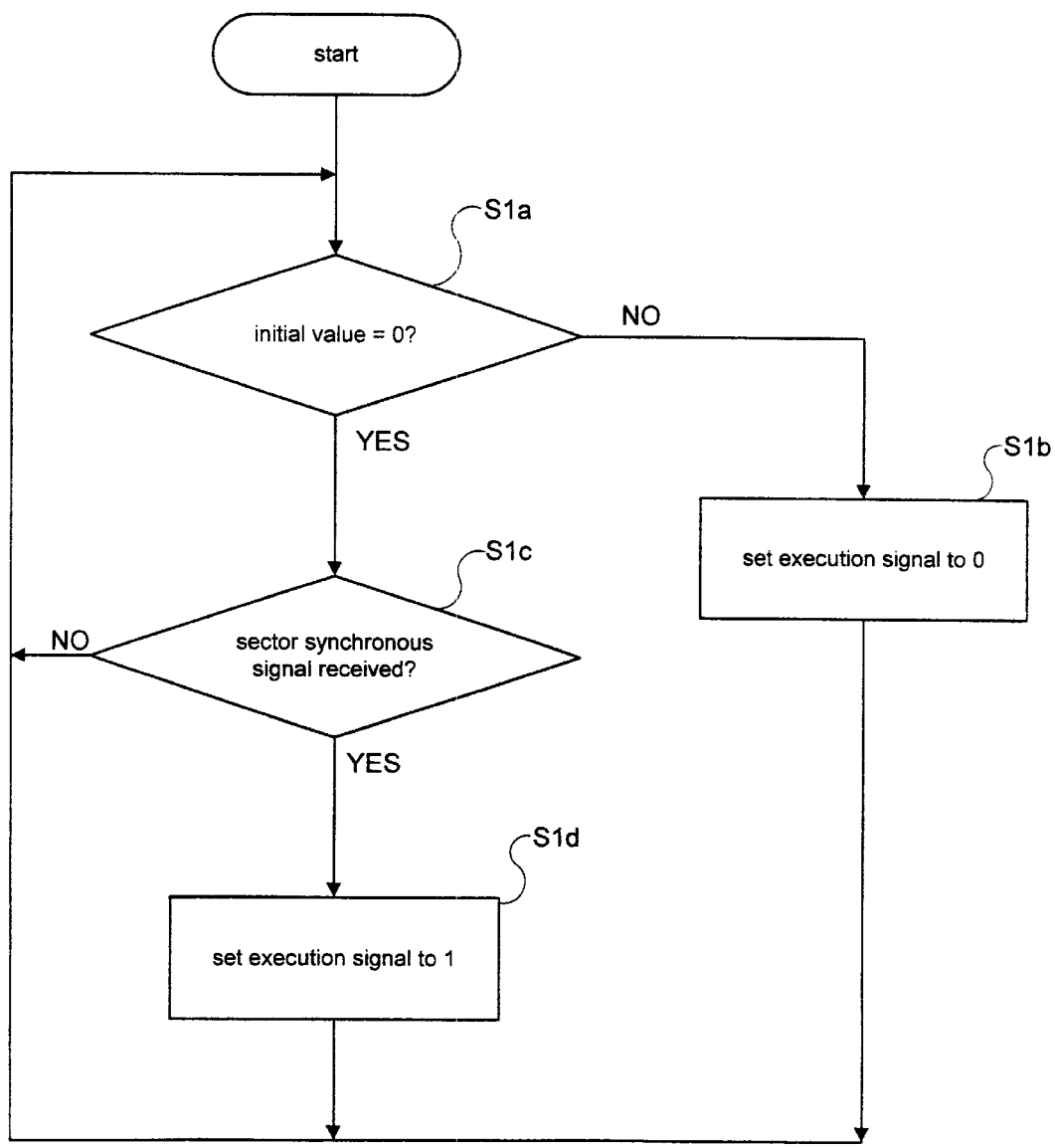
FIG. 8 is a flowchart illustrating the execution signal setting step in FIG. 7.

FIG. 8 is a flowchart illustrating the execution signal setting step S1 in FIG. 7. The execution signal setting step S1 is adapted to generate the execution signal for the initial input of the sector synchronous signal. As shown in FIG. 8, the execution signal setting step S1 includes step S1 a of checking whether an initial value is 0. If the initial value is not 0 at step S1a, the execution signal is set to 0 at step S1b. To the contrary, in the case where the initial value is 0 at step S1a, the decision is made at step S1c as to whether the sector synchronous signal has been received. If the sector synchronous signal has not been received at step S1c, the operation returns to the above step S1a. However, in the case where the sector synchronous signal has been received at step S1c, the execution signal is set to 1 at step S1d.

Figure 9:
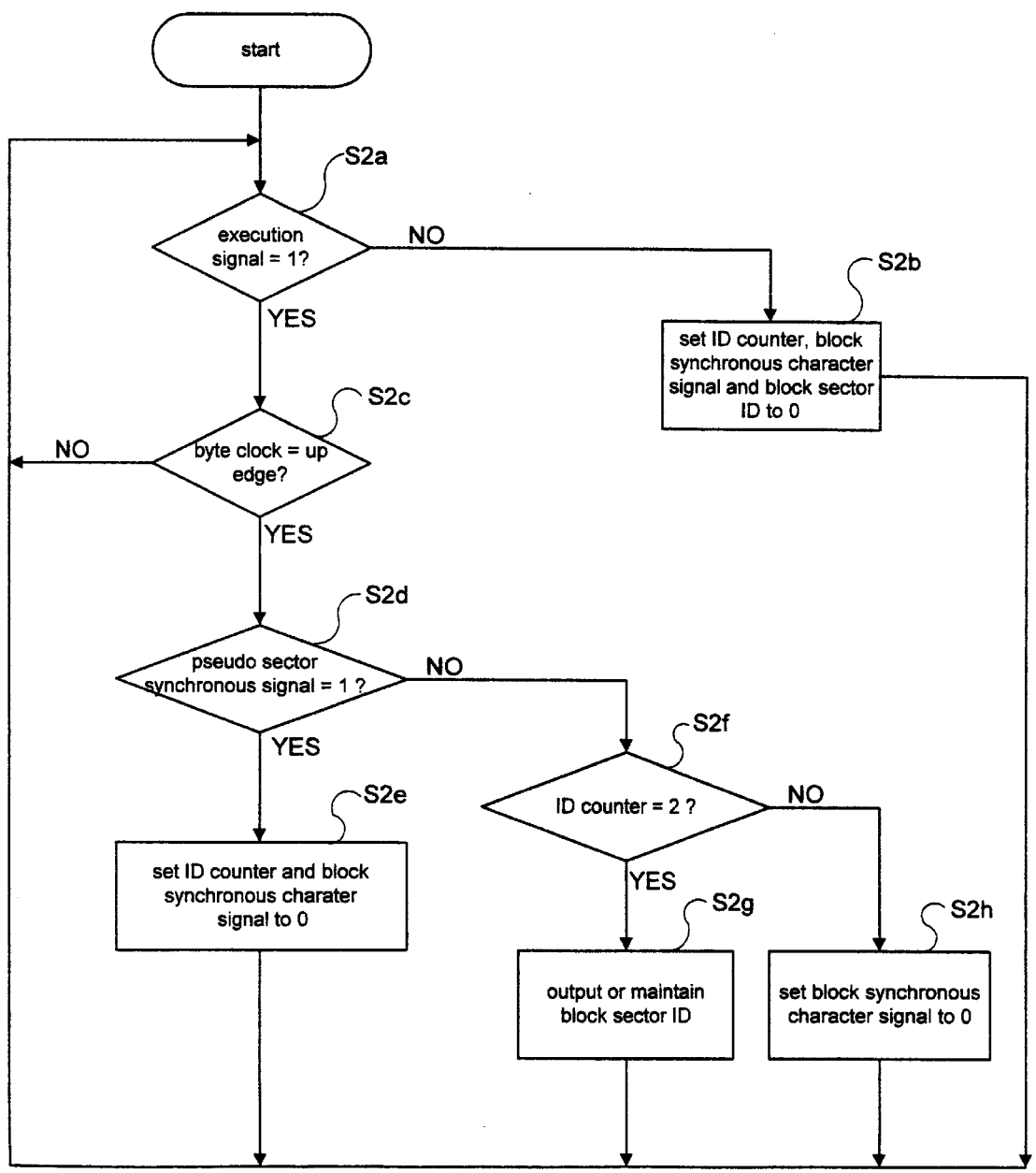
FIG. 9 is a flowchart illustrating the byte sector synchronous signal/byte clock setting step in FIG. 7.

FIG. 9 is a flowchart illustrating the byte sector synchronous signal/byte clock setting step S2 in FIG. 7. As shown in this drawing, the byte sector synchronous signal/byte clock setting step S2 includes step S2a of checking whether the execution signal is 1. If the execution signal is not 1 at step S2a, an ID counter, the block synchronous signal and a block sector ID are all set to 0 at step S2b. To the contrary, in the case where the execution signal is 1 at step S2a, the decision is made at step S2c as to whether the byte clock is an up edge. If the byte clock is not the up edge at step S2c, the operation returns to the above step S2a. However, in the case where the byte clock is the up edge at step S2c, the decision is made at step S2d as to whether a pseudo sector synchronous signal is 1. If the pseudo sector synchronous signal is 1 at step S2d, the ID counter and block synchronous signal are both set to 0 at step S2e. To the contrary, if the pseudo sector synchronous signal is not 1 at step S2d, the decision is made at step S2f about whether the ID counter is 2. If the ID counter is 2 at step S2f, the decision is made at step S2g as to whether low-order 4 bits of a least significant byte of the current 4-byte sector ID are all 0. Then at step S2g, if the low-order 4 bits of the least significant byte are all 0, the block synchronous signal is set to 1 and high-order 4 bits of the least significant byte are outputted as the block sector ID. However, if at step S2g all of the low-order 4 bits of the least significant byte are not 0 because the current sector ID is not an integer multiple of 16, the block synchronous signal is set to 0 and the block sector ID remains at its previous state. On the other hand, if the ID counter is not 2 at step S2f, the decision is made at step S2h as to whether the current byte is lower than the least significant byte of the current sector ID. Then at step S2h, if the current byte is lower than the least significant byte of the current sector ID, the ID counter is incremented to set the block synchronous signal to 0. To the contrary, if at step 2h the current byte is not lower than the least significant byte of the current sector ID, the ID counter is stopped to set the block synchronous signal to 0.

Figure 10:
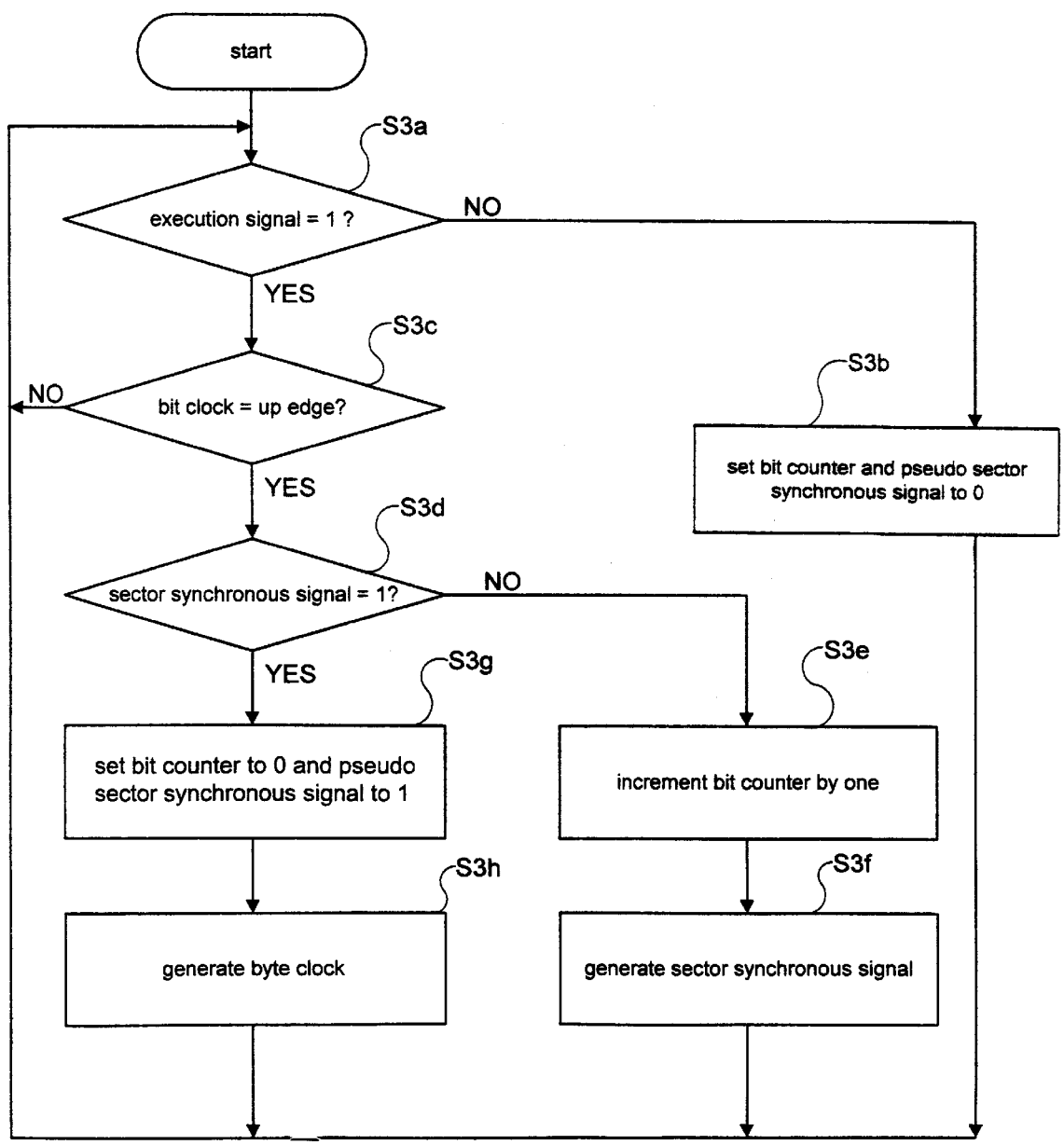
FIG. 10 is a flowchart illustrating the block synchronous signal generating step in FIG. 7.

FIG. 10 is a flowchart illustrating the block synchronous signal generating step S3 in FIG. 7. As shown in this drawing, the block synchronous signal generating step S3 includes step S3a of checking whether the execution signal is 1. If the execution signal is not 1 at step S3a, a bit counter and a pseudo sector synchronous signal are both set to 0 at step S3b. To the contrary, in the case where the execution signal is 1 at step S3a, the decision is made at step S3c as to whether a bit clock is an up edge. If the bit clock is not the up edge at step S3c, the operation returns to the above step S3a. However, in the case where the bit clock is the up edge at step S3c, the decision is made at step S3d as to whether the sector synchronous signal is 1. If the sector synchronous signal is not 1 at step S3d, the bit counter is incremented by one at step S3e. Then, the decision is made at step S3f about whether the bit counter is 7, namely, whether the bit counter has counted 8 bits. Then at step S3f; if the bit counter is 7, the pseudo sector synchronous signal is set to 0. However, if the bit counter is not 7, namely, if the bit counter has not counted 8 bits yet, the pseudo sector synchronous signal remains at its previous state. On the other hand, in the case where the sector synchronous signal is 1 at step S3d, the bit counter is set to 0 and pseudo sector synchronous signal is set to 1 at step S3g to generate the byte clock at step S3h, which has a frequency corresponding to ⅛ of that of the bit clock.

Figure 11:
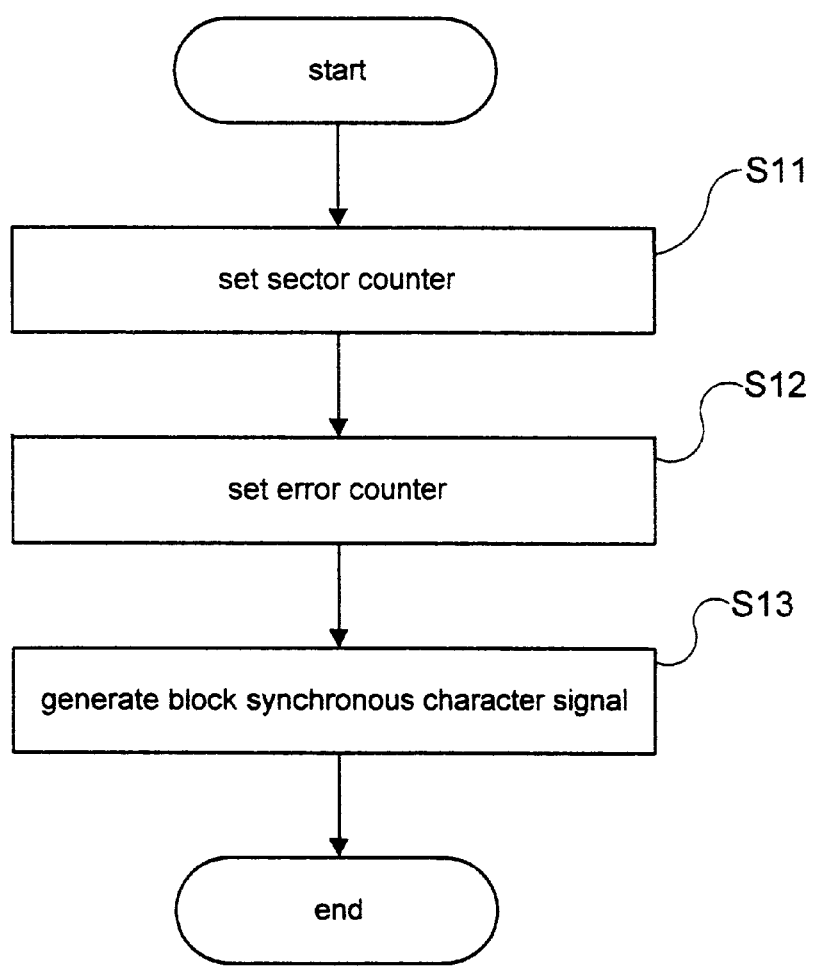
FIG. 11 is a flowchart illustrating a method of compensating for an error in the block synchronous signal for the DVD in accordance with the present invention.

FIG. 11 is a flowchart illustrating a method of compensating for an error in the block synchronous signal for the DVD in accordance with the present invention. The block synchronous signal compensation method is adapted to compensate for an error in the block synchronous signal resulting from an erroneous sector ID. As shown in FIG. 11, the block synchronous signal compensation method comprises step S11 of setting a sector counter, step S12 of setting an error counter, and step S13 of generating the block synchronous signal.

Figure 12:
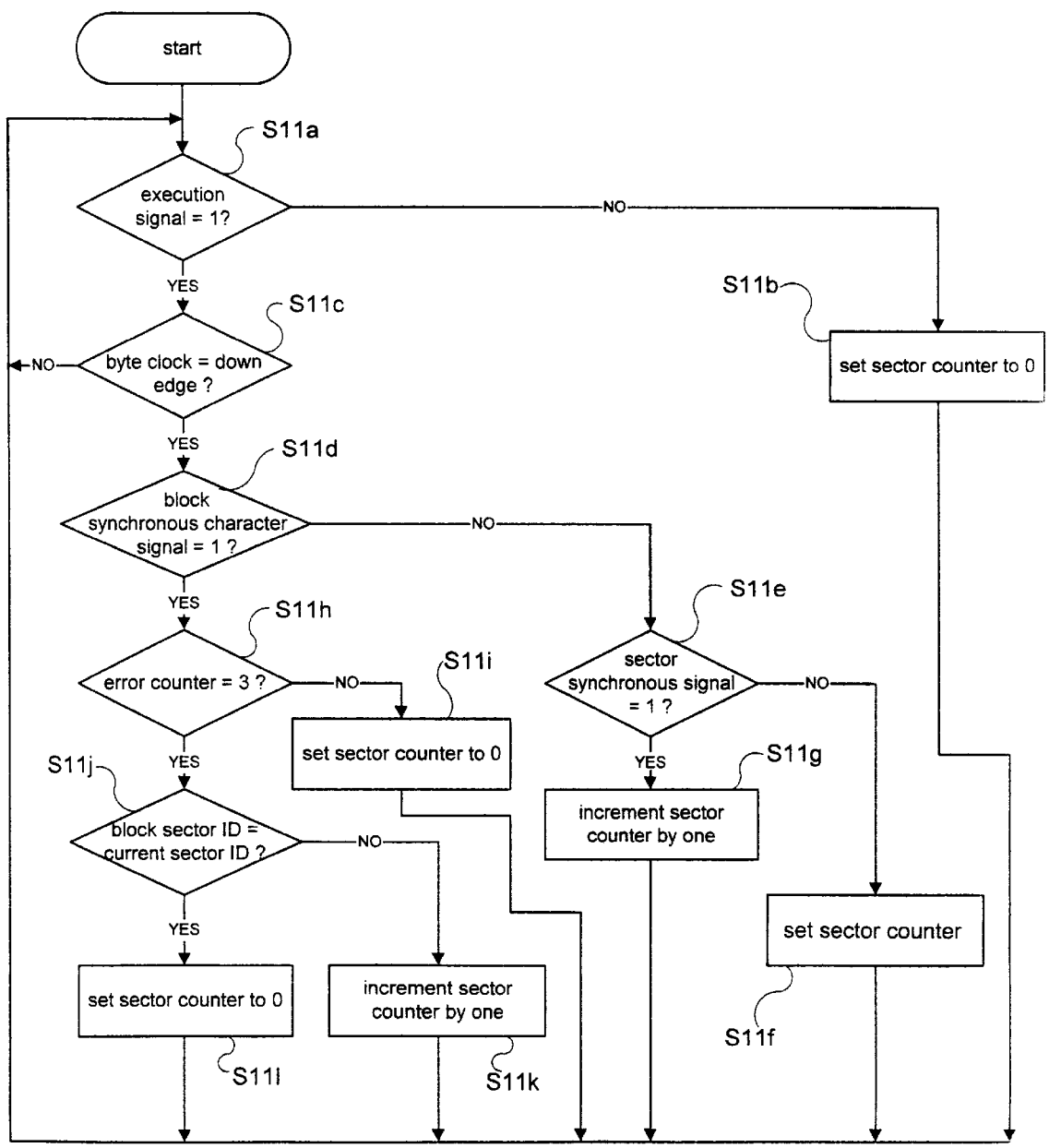
FIG. 12 is a flowchart illustrating the sector counter setting step in FIG. 11.

FIG. 12 is a flowchart illustrating the sector counter setting step S11 in FIG. 11. As shown in this drawing, the sector counter setting step S11 includes step S11a of checking whether an execution signal is 1. If the execution signal is not 1 at step S11a, the sector counter is set to 0 at step S11b. To the contrary, in the case where the execution signal is 1 at step S11a, the decision is made at step S11c as to whether a byte clock is a down edge. If the byte clock is not the down edge at step S11c, the operation returns to the above step S11a. However, in the case where the byte clock is the down edge at step S11c, the decision is made at step S11d as to whether the block synchronous signal is 1. If the block synchronous signal is not 1 at step S11d, the decision is made at step S11e as to whether a sector synchronous signal is 1. If the sector synchronous signal is not 1 at step S11e, the sector counter is set at step S11f. To the contrary, if the sector synchronous signal is 1 at step S11e, the sector counter is incremented by one at step S11g. On the other hand, in the case where the block synchronous signal is 1 at step S11d, the decision is made at step S11h as to whether the error counter is 3, which is an error correction reference value selectable by the user. If the error counter is not 3 at step S11h, the sector counter is set to 0 at step S11i so that its counting operation can be started to generate the block synchronous signal. However, in the case where the error counter is 3 at step S11h, the decision is made at step S11j as to whether a block sector ID is equal to the current sector ID. If the block sector ID is not equal to the current sector ID at step S11j, it is recognized that the block synchronous signal is not valid, and, thus, the sector counter is incremented by one at step S11k to generate a pseudo block synchronous signal. Namely, the pseudo block synchronous signal is generated after the sector counter counts 16. However, in the case where the block sector ID is equal to the current sector ID at step S11j, it is recognized that the block synchronous signal is valid, and, thus, the sector counter is set to 0 at step S11l.

Figure 13:
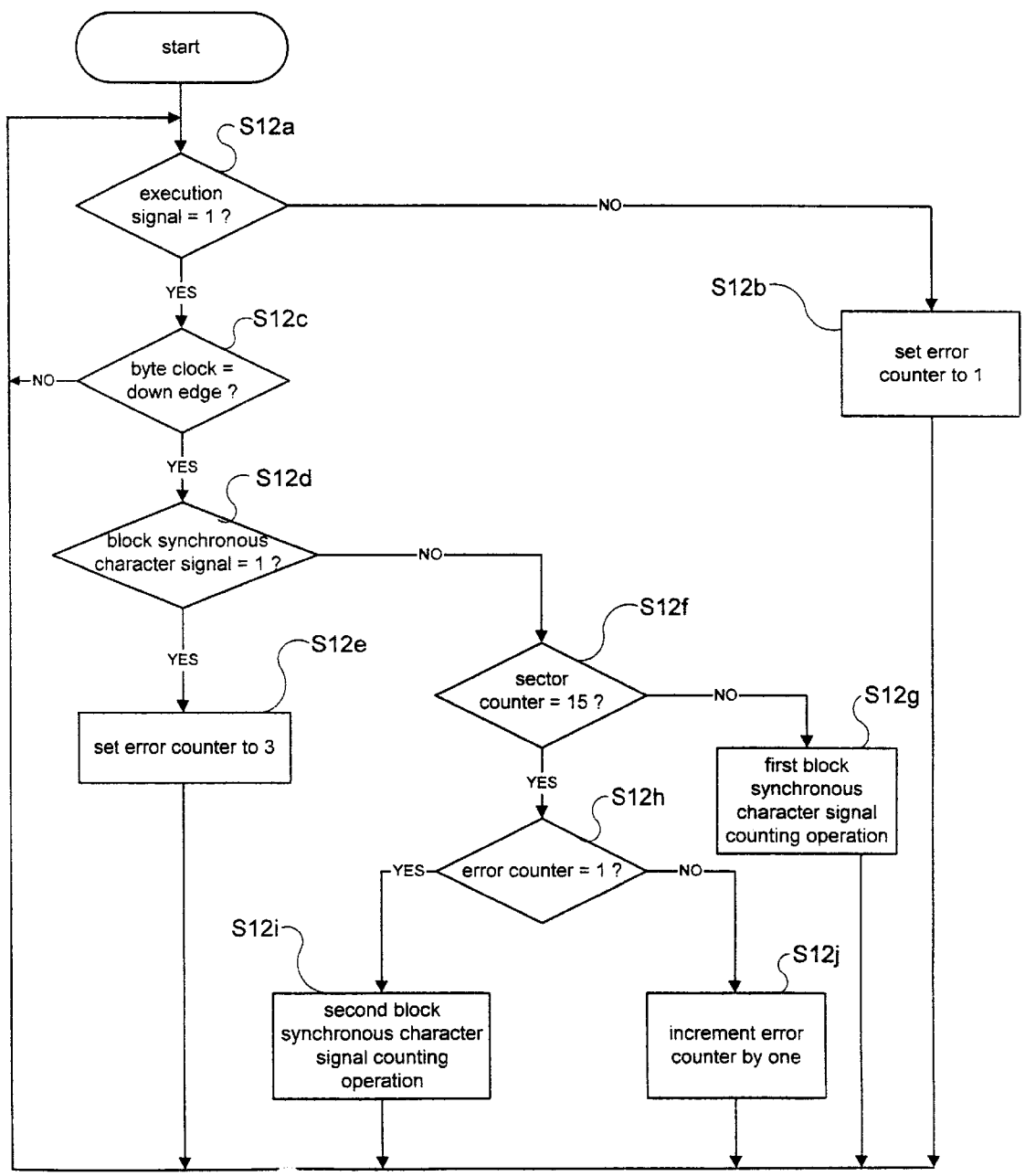
FIG. 13 is a flowchart illustrating the error counter setting step in FIG. 11.

FIG. 13 is a flowchart illustrating the error counter setting step S12 in FIG. 11. As shown in this drawing, the error counter setting step S12 includes step S12a of checking whether an execution signal is 1. If the execution signal is not 1 at step S12a, the error counter is set to 1 at step S12b. To the contrary, in the case where the execution signal is 1 at step S12a, the decision is made at step S12c as to whether a byte clock is a down edge. If the byte clock is not the down edge at step S12c, the operation returns to the above step S12a. However, in the case where the byte clock is the down edge at step S12c, the decision is made at step S12d as to whether the block synchronous signal is 1. If the block synchronous signal is 1 at step S12d, the error counter is set to 3 at step S12e. In the case where the block synchronous signal is not 1 at step S12d, the decision is made at step S12f as to whether the sector counter is 15.

In the case where the sector counter is not 15 at step S12f, it is recognized that an error is present in the block synchronous signal, and, thus, a block synchronous signal counting operation is performed at step S12g to generate a maximum of two pseudo block synchronous signals in order to compensate for the block synchronous signal. However, if the sector counter is 15 at step S12f, the decision is made at step S12h as to whether the error counter is 1. If the error counter is 1 at step S12h, the block synchronous signal counting operation is performed at step S12i to generate a maximum of two pseudo block synchronous signals in order to compensate for the block synchronous signal. In the case where the error counter is not 1 at step S12h, it is incremented by one at step S12j and the operation then returns to the above step S12a.

Figure 14A:
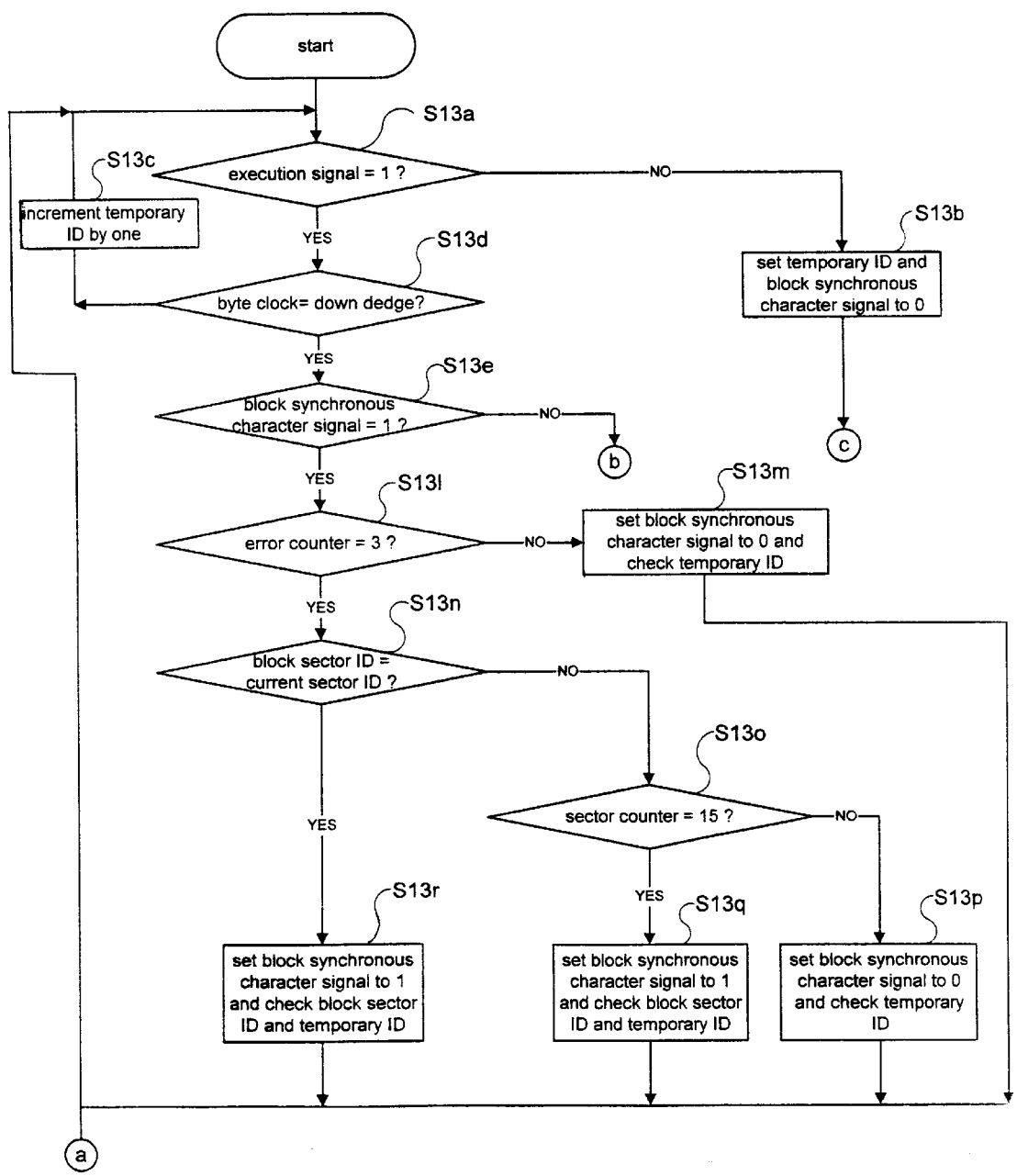
FIGS. 14A and 14B are flowcharts illustrating the block synchronous signal generating step in FIG. 11.
Figure 14B:
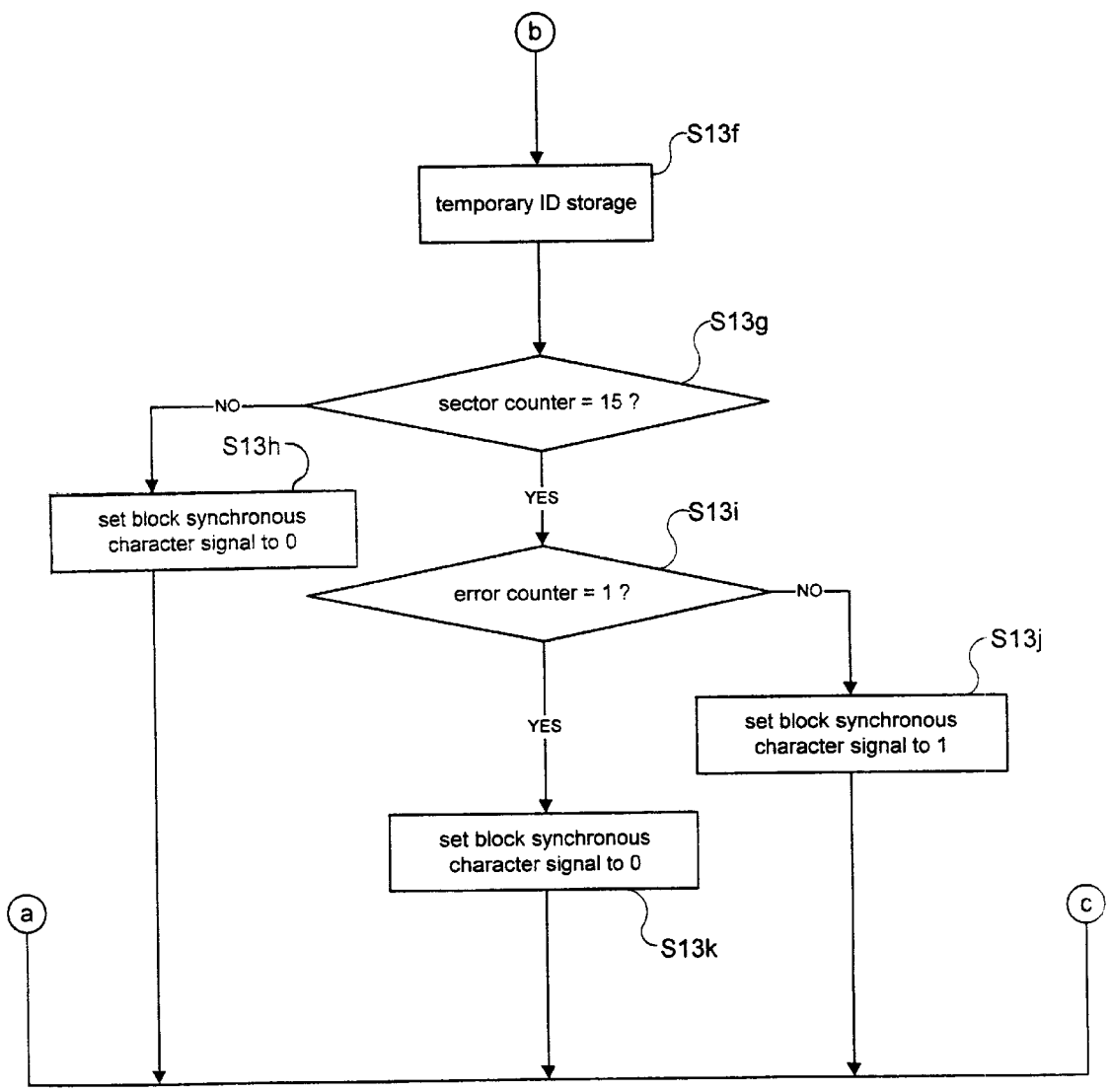

FIGS. 14A and 14B are flowcharts illustrating the block synchronous signal generating step S13 in FIG. 11. As shown in these drawings, the block synchronous signal generating step S13 includes step S13a of checking whether an execution signal is 1. If the execution signal is not 1 at step S13a, a temporary ID and the block synchronous signal are both set to 0 at step S13b. To the contrary, in the case where the execution signal is 1 at step S13a, the decision is made at step S13d as to whether a byte clock is a down edge. If the byte clock is not the down edge at step S13d, the temporary ID is incremented by one at step S13c and the operation then returns to the above step S13a. However, in the case where the byte clock is the down edge at step S13d, the decision is made at step S13e as to whether the block synchronous signal is 1. If the block synchronous signal is not 1 at step S13e, the operation proceeds to a temporary ID storage step S13f of temporarily storing the current ID in a memory to calculate it. Then, the decision is made at step S13g as to whether the sector counter is 15. If the sector counter is not 15 at step S13g, it is recognized that the block synchronous signal cannot be generated, and, thus, the block synchronous signal is set to 0 at step S13h. To the contrary, in the case where the sector counter is 15 at step S13g, the decision is made at step S13i as to whether the error counter is 1. If the error counter is not 1 at step S13i, it is recognized that the block synchronous signal can be again generated, and, thus, the block synchronous signal is set to 1 at step S13*j*. However, if the error counter is 1 at step S13*i*, the block synchronous signal is set to 0 at step S13*k*.

On the other hand, in the case where the block synchronous signal is 1 at step S13*e*, the decision is made at step S131 as to whether the error counter is 3. If the error counter is not 3 at step S131, it is recognized that the block synchronous signal can be generated, and, thus. the block synchronous signal is set to 0 at step S13*m*. Also at step S13*m*, the temporary ID is checked. To the contrary, in the case where the error counter is 3 at step S13*l*, the decision is made at step S13*n* as to whether a block sector ID is equal to the current sector ID. If the block sector ID is not equal to the current sector ID at step S13*n*, the decision is made at step S13*o* as to whether the sector counter is 15. If the sector counter is not 15 at step S13*o*, it is recognized that the sector counter is in operation, namely, the block synchronous signal cannot be generated now. Thus, the block synchronous signal is set to 0 at step S13*p*. Also at step S13*p*, the temporary ID is checked. However, in the case where the sector counter is 15 at step S13*o*, the block synchronous signal is set to 1 at step S13*q*. Then at step S13*q*, the decision is made about whether the block sector ID is equal to the temporary ID.

On the other hand, in the case where the block sector ID is equal to the current sector ID at step S13*n*, it is recognized that no error is present in the block synchronous signal, and, thus, the block synchronous signal is set to 1 at step S13*r*. Then at step S13*r*, the decision is made about whether the block sector ID is equal to the temporary ID.

As apparent from the above description, according to the present invention, the block synchronous signal generator generates the block synchronous signal, and the block synchronous signal compensator compensates for an error in an ID indicative of the head of the block synchronous signal, thereby obtaining highly reliable data.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating a block synchronous signal for a digital versatile disc, comprising:
    a byte clock generator for generating a byte clock and a byte frame synchronous signal in response to a bit clock and a frame synchronous signal to convert bit-unit input data into byte-unit data;
    a first delay for delaying said frame synchronous signal from said byte clock generator in response to said byte clock therefrom;
    a second delay for delaying data horizontally decoded by an RS decoder in response to said byte clock from said byte clock generator;
    a third delay for delaying a sector synchronous signal in response to said byte clock from said byte clock generator;
    an identifier error correction code decoder for decoding output data from said second delay in response to an output sector synchronous signal from said third delay;
    a fourth delay for delaying an output frame synchronous signal from said first delay in response to said byte clock from said byte clock generator while said identifier error correction code decoder decodes said output data from said second delay and applies the delayed frame synchronous signal to a row address generator;
    a block synchronous signal generator for generating said block synchronous signal and a block sector identifier in response to sector identifiers corrected by said identifier error correction code decoder and an output sector synchronous signal therefrom, said block sector identifier corresponding to an integer multiple of 16;
    a block synchronous signal compensator for compensating for an error in said block synchronous signal generated by said block synchronous signal generator in response to an output sector synchronous signal and said block sector identifier therefrom;
    a fifth delay for delaying an output frame synchronous signal from said block synchronous signal generator in response to an output byte clock therefrom; and
    a sixth delay for delaying output data from said block synchronous signal generator in response to said output byte clock therefrom.

2. An apparatus for generating a block synchronous signal for a digital versatile disc, as set forth in claim 1, wherein said block synchronous signal generator includes:
    an identifier counter for counting the fourth high-order byte of a header of the current sector upon receiving said output sector synchronous signal from said identifier error correction code decoder; and
    means for generating said block synchronous signal when the result counted by said identifier counter indicates that low-order 4 bits of said fourth high-order byte are all 0.

3. An apparatus for generating a block synchronous signal for a digital versatile disc, as set forth in claim 2, wherein said block synchronous signal generator further includes means for outputting high-order 4 bits of said fourth high-order byte as said block sector identifier to correct an error in said block synchronous signal.

4. An apparatus for generating a block synchronous signal for a digital versatile disc, as set forth in claim 1, wherein said block synchronous signal compensator is adapted to generate pseudo block synchronous signals when said block synchronous signal is erroneously generated due to errors in said sector identifier and sector synchronous signal from said block synchronous signal generator.

5. An apparatus for generating a block synchronous signal for a digital versatile disc, as set forth in claim 4, wherein said block synchronous signal compensator is adapted to generate a maximum of two pseudo block synchronous signals to compensate for an error in said block synchronous signal.

6. A method of generating a block synchronous signal for a digital versatile disc, comprising the steps of:
    (a) setting an execution signal; wherein said execution signal setting step (a) includes the steps of:
        (a-1) checking whether an initial value is 0;
        (a-2) setting said execution signal to 0 if said initial value is not 0 at said step (a-1);
        (a-3) checking whether said sector synchronous signal has been received, if said initial value is 0 at said step (a-1);
        (a-4) returning to said step (a-1) if said sector synchronous signal has not been received at said step (a-3); and
        (a-5) setting said execution signal to 1 if said sector synchronous signal has been received at said step (a-3);
    (b) setting a byte sector synchronous signal and a byte clock in accordance with said execution signal of step (a); and
    (c) generating said block synchronous signal in accordance with said byte sector synchronous signal and said byte clock of step (b).

7. A method of generating a block synchronous signal for a digital versatile disc, as set forth in claim 6, wherein said execution signal setting step (a) includes the steps of:
(a-1) checking whether an initial value is 0;
(a-2) setting said execution signal to 0 if said initial value is not 0 at said step (a-1);
(a-3) checking whether said sector synchronous signal has been received, if said initial value is 0 at said step (a-1);
(a-4) returning to said step (a-1) if said sector synchronous signal has not been received at said step (a-3); and
(a-5) setting said execution signal to 1 if said sector synchronous signal has been received at said step (a-3).

8. A method of generating a block synchronous signal for a digital versatile disc, as set forth in claim 6, wherein said byte sector synchronous signal/byte clock setting step (b) includes the steps of:
(b-1) checking whether said execution signal is 1;
(b-2) setting an identifier counter, said block synchronous signal and a block sector identifier to 0 if said execution signal is not 1 at said step (b-1);
(b-3) checking whether said byte clock is an up edge, if said execution signal is 1 at said step (b-1);
(b-4) returning to said step (b-1) if said byte clock is not said up edge at said step (b-3);
(b-5) checking whether a pseudo sector synchronous signal is 1, if said byte clock is said up edge at said step (b-3);
(b-6) setting said identifier counter and block synchronous signal to 0 if said pseudo sector synchronous signal is 1 at said step (b-5);
(b-7) checking whether said identifier counter is 2, if said pseudo sector synchronous signal is not 1 at said step (b-5);
(b-8) checking whether low-order 4 bits of a least significant byte of the current 4-byte sector identifier are all 0, if said identifier counter is 2 at said step (b-7);
(b-8) if said low-order 4 bits of said least significant byte are all 0 at said step (b-8), setting said block synchronous signal to 1 and outputting high-order 4 bits of said least significant byte as said block sector identifier;
(b-9) if all of said low-order 4 bits of said least significant byte are not 0 at said step (b-8), setting said block synchronous signal to 0 and maintaining said block sector identifier at its previous state;
(b-10) checking whether the current byte is lower than said least significant byte of the current sector identifier, if said identifier counter is not 2 at said step (b-7);
(b-11) incrementing said identifier counter to set said block synchronous signal to 0, if the current byte is lower than said least significant byte of the current sector identifier at said step (b-10); and
(b-12) stopping said identifier counter to set said block synchronous signal to 0, if the current byte is not lower than said least significant byte of the current sector identifier at said step (b-10).

9. A method of generating a block synchronous signal for a digital versatile disc, as set forth in claim 6, wherein said block synchronous signal generating step (c) includes the steps of:
(c-1) checking whether said execution signal is 1;
(c-2) setting a bit counter and a pseudo sector synchronous signal to 0 if said execution signal is not 1 at said step (c-1);
(c-3) checking whether a bit clock is an up edge, if said execution signal is 1 at said step (c-1);
(c-4) returning to said step (c-1) if said bit clock is not said up edge at said step (c-3);
(c-5) checking whether said sector synchronous signal is 1, if said bit clock is said up edge at said step (c-3);
(c-6) if said sector synchronous signal is not 1 at said step (c-5), incrementing said bit counter by one and then checking whether said bit counter is 7;
(c-7) setting said pseudo sector synchronous signal to 0 if said bit counter is 7 at said step (c-6);
(c-8) maintaining said pseudo sector synchronous signal at its previous state if said bit counter is not 7 at said step (c-6); and
(c-9) if said sector synchronous signal is 1 at said step (c-5), setting said bit counter to 0 and pseudo sector synchronous signal to 1, to generate said byte clock in such a manner that it can have a frequency corresponding to ⅛ of that of said bit clock.

10. A method of compensating for an error in a block synchronous signal for a digital versatile disc, comprising the steps of:
(a) setting a sector counter; wherein said sector counter setting step (a) includes the steps of:
(a-1) checking whether an execution signal is 1;
(a-2) setting said sector counter to 0 if said execution signal is not 1 at said step (a-1);
(a-3) checking whether a byte clock is a down edge, if said execution signal is 1 at said step (a-1);
(a-4) returning to said step (a-1) if said byte clock is not said down edge at said step (a-3);
(a-5) checking whether said block synchronous signal is 1, if said byte clock is said down edge at said step (a-3);
(a-6) checking whether a sector synchronous signal is 1, if said block synchronous signal is not 1 at said step (a-5);
(a-7) setting said sector counter if said sector synchronous signal is not 1 at said step (a-6);
(a-8) incrementing said sector counter by one if said sector synchronous signal is 1 at said step (a-6);
(a-9) checking whether said error counter is 3, if said block synchronous signal is 1 at said step (a-5);
(a-10) if said error counter is not 3 at said step (a-9), setting said sector counter to 0 so that its counting operation can be started to generate said block synchronous signal;
(a-11) checking whether a block sector identifier is equal to the current sector identifier, if said error counter is 3 at said step (a-9);
(a-12) if said block sector identifier is not equal to the current sector identifier at said step (a-11), recognizing that said block synchronous signal is not valid and then incrementing said sector counter by one to generate a pseudo block synchronous signal; and
(a-13) if said block sector identifier is equal to the current sector identifier at said step (a-11), recognizing that said block synchronous signal is valid and then setting said sector counter to 0;
(b) setting an error counter in accordance with said sector counter of step (a); and
(c) generating said block synchronous signal in accordance with said error counter of step (b).

11. A method of compensating for an error in a block synchronous signal for a digital versatile disc, as set forth in claim 10, wherein said sector counter setting step (a) includes the steps of:

(a-1) checking whether an execution signal is 1;

(a-2) setting said sector counter to 0 if said execution signal is not 1 at said step (a-1);

(a-3) checking whether a byte clock is a down edge, if said execution signal is 1 at said step (a-1);

(a-4) returning to said step (a-1) if said byte clock is not said down edge at said step (a-3);

(a-5) checking whether said block synchronous signal is 1, if said byte clock is said down edge at said step (a-3);

(a-6) checking whether a sector synchronous signal is 1, if said block synchronous signal is not 1 at said step (a-5);

(a-7) setting said sector counter if said sector synchronous signal is not 1 at said step (a-6);

(a-8) incrementing said sector counter by one if said sector synchronous signal is 1 at said step (a-6);

(a-9) checking whether said error counter is 3, if said block synchronous signal is 1 at said step (a-5);

(a-10) if said error counter is not 3 at said step (a-9), setting said sector counter to 0 so that its counting operation can be started to generate said block synchronous signal;

(a-11) checking whether a block sector identifier is equal to the current sector identifier, if said error counter is 3 at said step (a-9);

(a-12) if said block sector identifier is not equal to the current sector identifier at said step (a-11), recognizing that said block synchronous signal is not valid and then incrementing said sector counter by one to generate a pseudo block synchronous signal; and (a-13) if said block sector identifier is equal to the current sector identifier at said step (a-11), recognizing that said block synchronous signal is valid and then setting said sector counter to 0.

12. A method of compensating for an error in a block synchronous signal for a digital versatile disc, as set forth in claim 10, wherein said error counter setting step (b) includes the steps of:

(b-1) checking whether an execution signal is 1;

(b-2) setting said error counter to 1 if said execution signal is not 1 at said step (b-1);

(b-3) checking whether a byte clock is a down edge, if said execution signal is 1 at said step (b-1);

(b-4) returning to said step (b-1) if said byte clock is not said down edge at said step (b-3);

(b-5) checking whether said block synchronous signal is 1, if said byte clock is said down edge at said step (b-3);

(b-6) setting said error counter to 3 if said block synchronous signal is 1 at said step (b-5);

(b-7) checking whether said sector counter is 15, if said block synchronous signal is not 1 at said step (b-5);

(b-8) if said sector counter is not 15 at said step (b-7), recognizing that an error is present in said block synchronous signal and then performing a block synchronous signal counting operation to generate a maximum of two pseudo block synchronous signals for the compensation for said block synchronous signal;

(b-9) checking whether said error counter is 1, if said sector counter is 15 at said step (b-7);

(b-10) generating a maximum of two pseudo block synchronous signals for the compensation for said block synchronous signal if said error counter is 1 at said step (b-9); and (b-11) if said error counter is not 1 at said step (b-9), incrementing said error counter by one and then returning to said step (b-1).

13. A method of compensating for an error in a block synchronous signal for a digital versatile disc, as set forth in claim 10, wherein said block synchronous signal generating step (c) includes the steps of:

(c-1) checking whether an execution signal is 1;

(c-2) setting a temporary identifier and said block synchronous signal to 0 if said execution signal is not 1 at said step (c-1);

(c-3) checking whether a byte clock is a down edge if said execution signal is 1 at said step (c-1);

(c-4) if said byte clock is not said down edge at said step (c-3), incrementing said temporary identifier by one and then returning to said step (c-1); (c-5) checking whether said block synchronous signal is 1, if said byte clock is said down edge at said step (c-3);

(c-6) if said block synchronous signal is not 1 at said step (c-5), temporarily storing the current identifier in a memory to calculate it and then checking whether said sector counter is 15;

(c-7) if said sector counter is not 15 at said step (c-6), recognizing that said block synchronous signal cannot be generated and then setting said block synchronous signal to 0;

(c-8) checking whether said error counter is 1, if said sector counter is 15 at said step (c-6);

(c-9) if said error counter is not 1 at said step (c-8), recognizing that said block synchronous signal can be again generated and then setting said block synchronous signal to 1;

(c-10) setting said block synchronous signal to 0 if said error counter is 1 at said step (c-8);

(c-11) checking whether said error counter is 3, if said block synchronous signal is 1 at said step (c-5);

(c-12) if said error counter is not 3 at said step (c-11), recognizing that said block synchronous signal can be generated, setting said block synchronous signal to 0 and then checking said temporary identifier;

(c-13) checking whether a block sector identifier is equal to the current sector identifier, if said error counter is 3 at said step (c-11);

(c-14) checking whether said sector counter is 15, if said block sector identifier is not equal to the current sector identifier at said step (c-13);

(c-15) if said sector counter is not 15 at said step (c-14), recognizing that said block synchronous signal cannot be generated because said sector counter is in operation, setting said block synchronous signal to 0 and then checking said temporary identifier;

(c-16) if said sector counter is 15 at said step (c-14), setting said block synchronous signal to 1 and then checking whether said block sector identifier is equal to said temporary identifier; and (c-17) if said block sector identifier is equal to the current sector identifier at said step (c-13), recognizing that no error is present in said block synchronous signal, setting said block synchronous signal to 1 and then checking whether said block sector identifier is equal to said temporary identifier.

* * * * *

UNITED STATES PATENT AND TRADEMARK OFFICE
CERTIFICATE OF CORRECTION

PATENT NO. : 6,160,777
DATED : December 12, 2000
INVENTOR(S) : Han Gyoon Kim

It is certified that error appears in the above-identified patent and that said Letters Patent is hereby corrected as shown below:

Column 5, line 22: "abovementioned" should read --above-mentioned--.

Column 6, line 7: "mainer" should read --manner--;

line 25: "S1 a" should read --S1a--;

line 43: "S2cas" should read --S2c as--.

Column 9, line 7: "S13l" should read --S13*l*--;

line 8: "S13l" should read --S13*l*--.

Signed and Sealed this

Fifteenth Day of May, 2001

Attest:

NICHOLAS P. GODICI

*Attesting Officer*      *Acting Director of the United States Patent and Trademark Office*